United States Patent
Thomas, Jr. et al.

(10) Patent No.: US 10,302,019 B2
(45) Date of Patent: May 28, 2019

(54) HIGH PRESSURE COMPRESSOR AUGMENTED BLEED WITH AUTONOMOUSLY ACTUATED VALVE

(71) Applicant: General Electric Company, Schenectady, NY (US)

(72) Inventors: Michael Anthony Thomas, Jr., Union, KY (US); Curtis William Moeckel, Cincinnati, OH (US); David William Fasig, Liberty Township, OH (US); Carlos Ivan Flores, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 354 days.

(21) Appl. No.: 15/059,716

(22) Filed: Mar. 3, 2016

(65) Prior Publication Data

US 2017/0254274 A1 Sep. 7, 2017

(51) Int. Cl.
*F02C 6/08* (2006.01)
*F02C 9/18* (2006.01)
(Continued)

(52) U.S. Cl.
CPC .............. *F02C 9/18* (2013.01); *F01D 17/145* (2013.01); *F02C 6/08* (2013.01); *F04D 27/023* (2013.01);
(Continued)

(58) Field of Classification Search
CPC ...... F02C 9/16; F02C 9/18; F02C 9/52; F05D 2220/32; F05D 2260/20; F05D 2260/60;
(Continued)

(56) References Cited

U.S. PATENT DOCUMENTS 2,698,711 A 1/1955 Newcomb
2,741,423 A 4/1956 Lombard
(Continued)

FOREIGN PATENT DOCUMENTS

FR 2925108 A1 * 6/2009 ............ F01D 11/18
GB 1 244 892 A 9/1971
JP 2009-243341 A 10/2009

OTHER PUBLICATIONS

Definition of autonomous in English by Oxford Dictionaries, retrieved from the Internet on Nov. 29, 2018, URL: https://en.oxforddictionaries.com/definition/autonornous.*

(Continued)

*Primary Examiner* — David E Sosnowski
*Assistant Examiner* — Sang K Kim
(74) *Attorney, Agent, or Firm* — General Electric Company; Pamela A. Kachur

(57) ABSTRACT

Gas turbine engine compressor bleed assembly includes annular bleed plenum between annular outer and inner casings circumscribing compressor flowpath of compressor, upstream and downstream bleed ports disposed through inner casing and between compressor flowpath and plenum at upstream and downstream stages. Bleed path extends from downstream bleed port through bleed plenum and out bleed outlet disposed through outer casing. Autonomously actuated valve such as poppet valve disposed in bleed path or downstream bleed port. Autonomously actuated or poppet valve may be set to open at take-off and/or climb. Bleed outlet may be customer and domestic or engine bleed outlet disposed through outer casing and in fluid bleed air communication with bleed plenum. Another assembly may include annular forward and aft bleed outlets connected to plenums. Bleed path extends from downstream bleed port through plenums and out forward bleed outlet.

11 Claims, 5 Drawing Sheets

(51) Int. Cl.
 F01D 17/14 (2006.01)
 F04D 27/02 (2006.01)
 F04D 29/58 (2006.01)

(52) U.S. Cl.
 CPC ....... F04D 27/0215 (2013.01); F04D 29/584 (2013.01); *F05D 2220/32* (2013.01); *F05D 2240/40* (2013.01); *F05D 2260/20* (2013.01); *F05D 2260/38* (2013.01); *F05D 2270/112* (2013.01); *F05D 2270/331* (2013.01); *Y02T 50/671* (2013.01)

(58) Field of Classification Search
 CPC ......... F05D 2270/112; F05D 2270/331; F01D 17/105; F01D 17/145; F01D 25/24; F04D 27/0215; F04D 27/023; F04D 27/009
 See application file for complete search history.

(56) References Cited

U.S. PATENT DOCUMENTS

| | | | |
|---|---|---|---|
| 3,022,040 A * | 2/1962 | Miller | F04D 27/0215 251/284 |
| 3,511,576 A | 5/1970 | Herbstritt et al. | |
| 3,945,759 A | 3/1976 | Bobo | |
| 4,574,585 A | 3/1986 | Conn | |
| 4,928,240 A | 5/1990 | Davison et al. | |
| 5,209,633 A | 5/1993 | McGreehan et al. | |
| 5,351,478 A | 10/1994 | Walker et al. | |
| 6,325,595 B1 | 12/2001 | Breeze-Stringfellow et al. | |
| 6,783,324 B2 | 8/2004 | Muny | |
| 7,555,905 B2 * | 7/2009 | Borcea | F02C 6/08 215/279 |
| 7,624,581 B2 * | 12/2009 | Moniz | F01D 17/105 60/226.1 |
| 8,734,091 B2 | 5/2014 | Moniz et al. | |
| 8,814,498 B2 | 8/2014 | Goodman et al. | |
| 9,518,513 B2 * | 12/2016 | Pritchard, Jr. | F01D 17/105 |
| 9,638,201 B2 * | 5/2017 | LeBlanc | F04D 27/0215 |
| 2014/0109589 A1 * | 4/2014 | Pritchard, Jr. | F02K 3/075 60/779 |
| 2015/0104289 A1 | 4/2015 | Mackin et al. | |
| 2016/0208692 A1 * | 7/2016 | Hanlon | F02C 9/18 |

OTHER PUBLICATIONS

Extended European Search Report and Opinion issued in connection with corresponding EP Application No. 17157655.6 dated Jul. 6, 2017.

Machine Translation and First Office Action and Search issued in connection with corresponding CN Application No. 201710124051.9 dated Jul. 3, 2018.

* cited by examiner

HIGH PRESSURE COMPRESSOR AUGMENTED BLEED WITH AUTONOMOUSLY ACTUATED VALVE

BACKGROUND OF THE INVENTION

Technical Field

The present invention relates generally to gas turbine engine compressor bleed ports and, more particularly, to bleed ports for extracting two or more portions of compressor air from two or more compressor stages.

Background Information

Gas turbine engines, such as an aircraft bypass turbofan engine, may bleed or extract air between stages of a multi-stage axial compressor for various purposes as explained in U.S. Pat. No. 6,325,595 to Breeze-Stringfellow et al. which issued Dec. 4, 2001, and is entitled "High recovery multi-use bleed". The extracted air is often referred to as secondary air and is used for turbine cooling, hot cavity purging, anti-ice, compressor clearance control, or turbine clearance control and is often referred to as domestic bleed because it is used for the engine. Secondary air is also often used to pressurize the aircraft cabin and for other aircraft purposes and is, thus, referred to as customer bleed. Domestic bleed flow levels are generally a constant percentage of compressor flow (i.e. 2%), whereas customer bleed requirements typically vary (i.e. 0-10%).

A typical gas turbine engine of the turbofan type generally includes a forward fan and a booster or low pressure compressor, a middle core engine, and a low pressure turbine which powers the fan and booster or low pressure compressor. The core engine includes a high pressure compressor (HPC), a combustor and a high pressure turbine (HPT) in a serial flow relationship. The high pressure compressor and high pressure turbine of the core engine are connected by a high pressure shaft. High pressure air from the high pressure compressor is mixed with fuel in the combustor and ignited to form a high energy gas stream. The gas stream flows through the high pressure turbine, rotatably driving it and the high pressure shaft which, in turn, rotatably drives the high pressure compressor.

The gas stream leaving the high pressure turbine is expanded through a second or low pressure turbine (LPT). The low pressure turbine extracts energy from the gas stream for rotatably driving the fan and booster compressor via a low pressure shaft. The low pressure shaft extends through the high pressure rotor. Most of the thrust produced is generated by the fan. Marine or industrial gas turbine engines have low pressure turbines which power generators, ship propellers, pumps and other devices while turboprops engines use low pressure turbines to power propellers usually through a gearbox.

The typical turbofan aircraft engine initially operates at a low power, idle mode and then undergoes an increase in power for takeoff and climb operation. Upon reaching cruise at the desired altitude of flight, the engine is operated at lower or intermediate power setting. The engine is also operated at lower power as the aircraft descends from altitude and lands on the runway, following which thrust reverse operation is typically employed with the engine again operated at high power.

Some engines have bleeds ports placed at HPC outer diameter (OD) casing which are used for customer and domestic air supplies. It is beneficial if such bleeds collect bleed air from the furthest forward HPC stages, to reduce the negative cycle impact for bleeding high enthalpy fluid. Utilizing bleed air from forward HPC stages, however, has the negative effect of providing lower secondary flow circuit driving pressures. It is, thus, desirable to provide increased flow pressures of bleed air supplied from OD HPC bleeds to secondary flow circuits.

BRIEF DESCRIPTION OF THE INVENTION

A gas turbine engine compressor bleed assembly includes an annular bleed plenum radially disposed between radially spaced apart annular outer and inner casings circumscribing a compressor flowpath of a compressor, upstream and downstream bleed ports disposed through the inner casing and radially between the compressor flowpath and the bleed plenum at upstream and downstream stages respectively of the compressor, a bleed path extending from the downstream bleed port through the bleed plenum and out a bleed outlet radially disposed through the outer casing, and an autonomously actuated valve disposed in the bleed path.

The autonomously actuated valve may be disposed in the downstream bleed port and may be a poppet valve and may be set to open at take-off and/or climb.

The upstream and downstream stages may be adjacent stages in the compressor or non-adjacent stages spaced two or more stages apart in the compressor.

The bleed outlet may be a customer and domestic or engine bleed outlet radially disposed through the outer casing and in fluid bleed air communication with the annular bleed plenum.

The annular bleed plenum may be one of annular forward and aft bleed plenums radially disposed between radially spaced apart annular outer and inner casings and circumscribing the compressor flowpath. The bleed outlet may be one of forward and aft bleed outlets in fluid bleed air communication with the forward and aft bleed plenums respectively and radially disposed through the outer casing. Upstream and downstream bleed ports may be disposed through the inner casing and radially between the compressor flowpath and the forward and aft bleed plenums at upstream and downstream stages respectively of the compressor. A bleed path may extend from the downstream bleed port through the forward and aft bleed plenums and out the forward bleed outlet and the autonomously actuated valve may be disposed in the bleed path. The autonomously actuated valve may be disposed in a bulkhead or a radially inwardly depending annular flange of the outer casing axially separating the forward and aft bleed plenums.

DETAILED DESCRIPTION OF THE INVENTION

Figure 1:
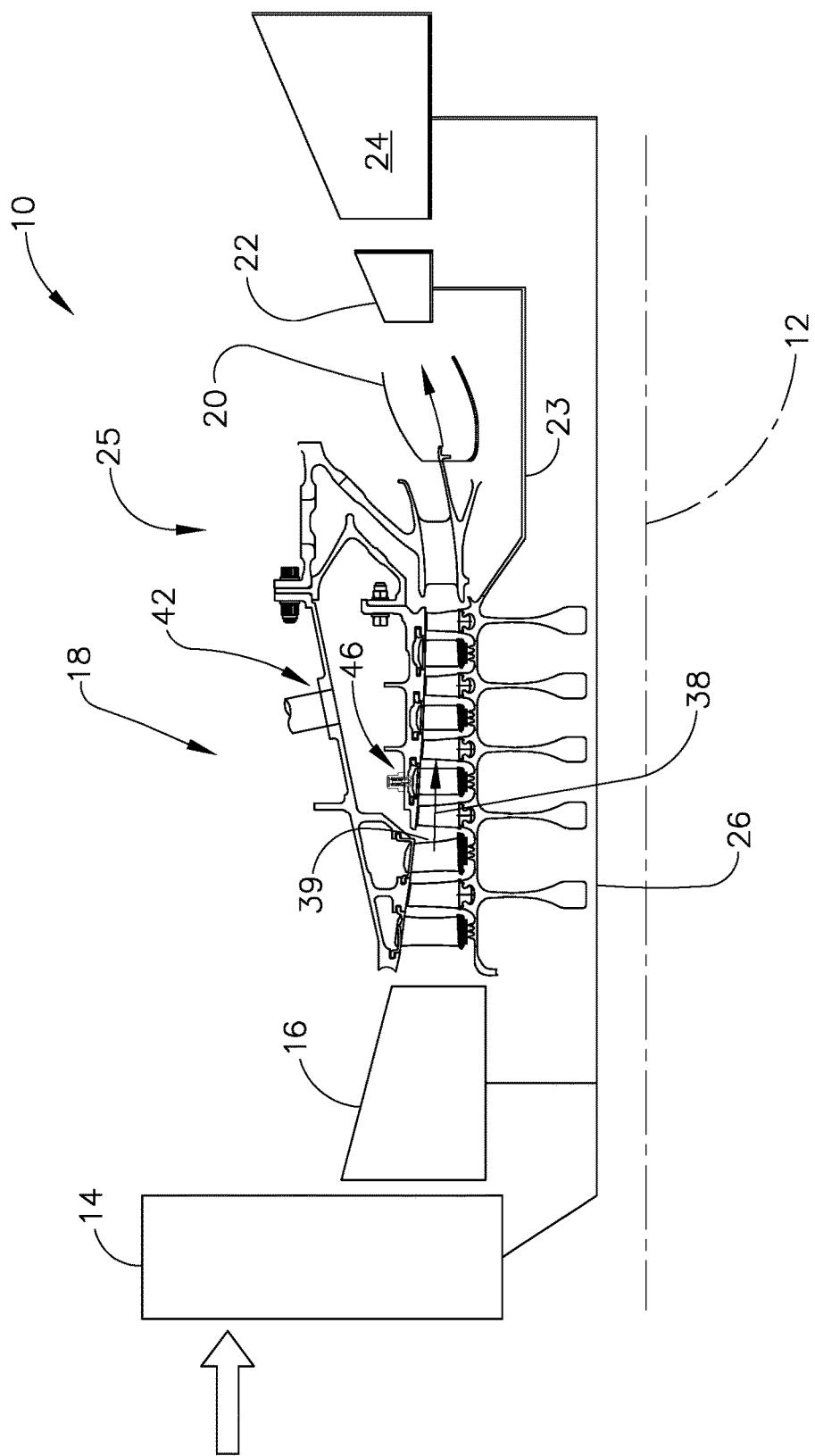
FIG. 1 is a schematic cross-sectional view illustration of a gas turbine engine with a high pressure compressor section having an exemplary embodiment of a self actuating bleed valve in a bleed path for flowing augmenting bleed air from an upstage bleed.

Illustrated in FIG. 1 is an exemplary aircraft turbofan gas turbine engine 10 circumscribed about an engine centerline 12 and suitably designed to be mounted to a wing or fuselage of an aircraft. The engine 10 includes, in downstream serial flow communication, a fan 14, a multi-stage low pressure compressor or booster 16, a high pressure compressor 18, a combustor 20, a multi-stage high pressure turbine (HPT) 22, and a low pressure turbine (LPT) 24. A core engine 25 includes the HPT or high pressure turbine 22 drivingly connected by a high pressure drive shaft 23 to the high pressure compressor 18 and the combustor 20. The LPT or low pressure turbine 24 is drivingly connected by a low pressure drive shaft 26 to both the fan 14 and the booster 16.

Figure 2:
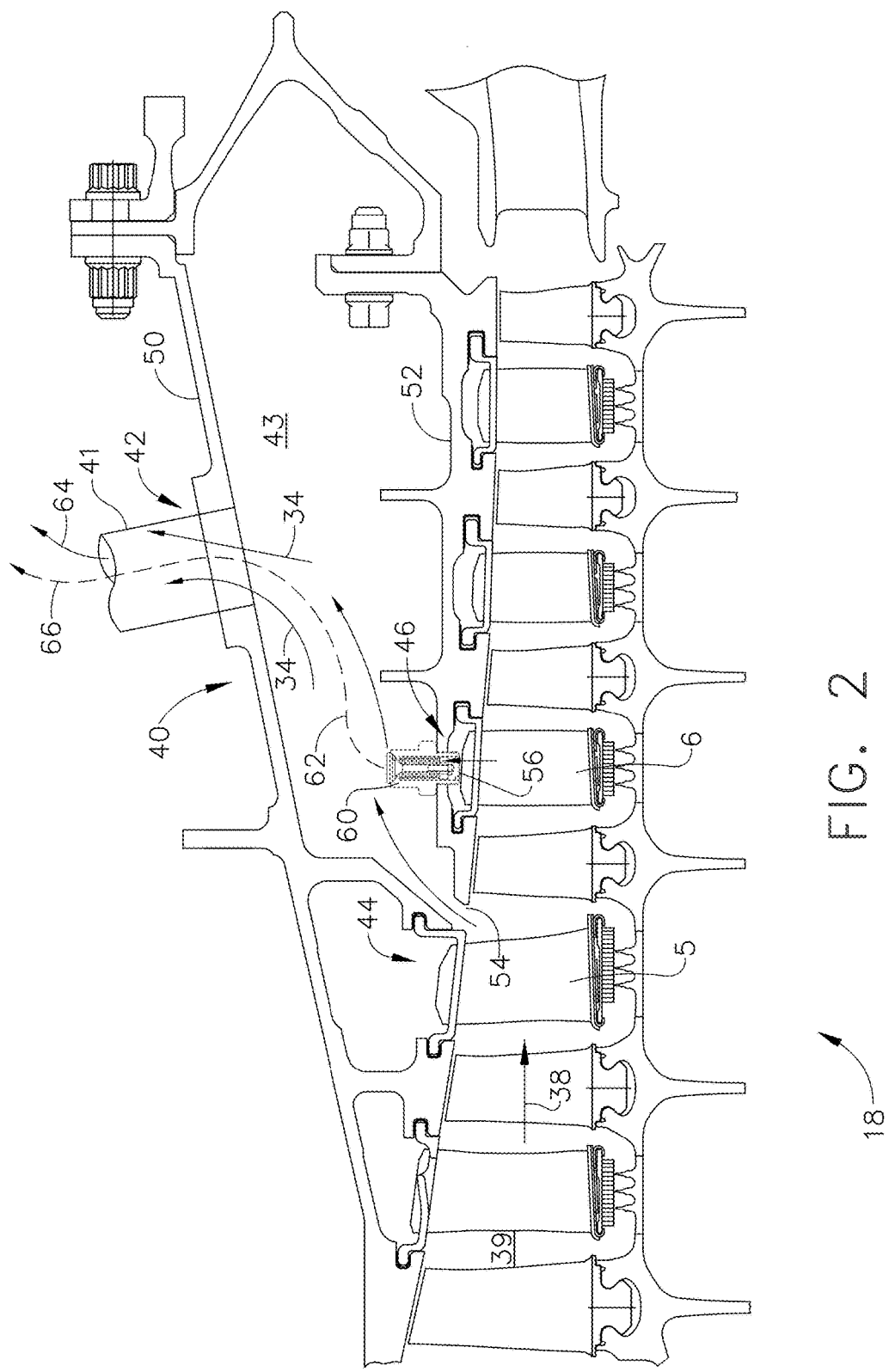
FIG. 2 is an enlarged schematic cross-sectional view illustration of the exemplary embodiment of the self actuating bleed valve in the bleed path for flowing augmenting bleed air from an upstage bleed illustrated in FIG. 1.

The exemplary turbofan aircraft gas turbine engine high pressure compressor (HPC) 18 illustrated schematically in FIGS. 1 and 2 includes a compressor bleed assembly 40 having at least one bleed outlet 42 in fluid communication with first and second or upstream and downstream stages 44, 46 of the high pressure compressor (HPC) 18. There may be a circular row of bleed outlets 42. The upstream and downstream stages 44, 46 may be axially adjacent such as fifth and sixth stages 5, 6 in the HPC 18. Pressure of the bleed air from the upstream stages 44 is, of course, lower than the pressure of the downstream stage 46.

The bleed outlet 42 is an inlet to a bleed duct 41 and is used for extracting compressor bleed flow 34 from compressor flow 38 in a compressor flowpath 39 between the upstream and downstream stages 44, 46. The bleed outlet 42 is in fluid flow communication with and serves as an outlet from an annular bleed plenum 43 circumferentially disposed between radially spaced apart annular outer and inner casings 50, 52. The bleed outlet 42 is radially disposed through the outer casing 50. The bleed duct 41 provides compressor bleed air for use as customer and domestic or engine bleed air 64, 66.

Upstream and downstream bleed ports 54, 56 from the upstream and downstream stages 44, 46 of the compressor 18 are disposed through the inner casing 52. A high pressure bleed path 62 extends from the downstream bleed port 56, through the bleed plenum 43, and out the bleed outlet 42 radially disposed through the outer casing 50. An autonomously actuated valve illustrated as a poppet valve 60 is disposed in the downstream bleed port 56 at the beginning of the high pressure bleed path 62. The autonomously actuated valve or poppet valve 60 is operable to augment lower pressure compressor bleed air from the upstream stage 44 with higher pressure compressor bleed air from the downstream stage 46 during high pressure operation or excursions during a mission or flight.

An exemplary method for using the compressor bleed assembly 40 is to supply an autonomously actuated valve or valves illustrated as the poppet valve 60 that remains closed at cruise and allows cruise bleed to be at a lower stage for cruise optimization. The poppet valve 60 is set to open at take-off and/or climb to augment the pressure of the compressor bleed flow 34 with higher pressure compressor air from the downstream stage 46.

Figure 3:
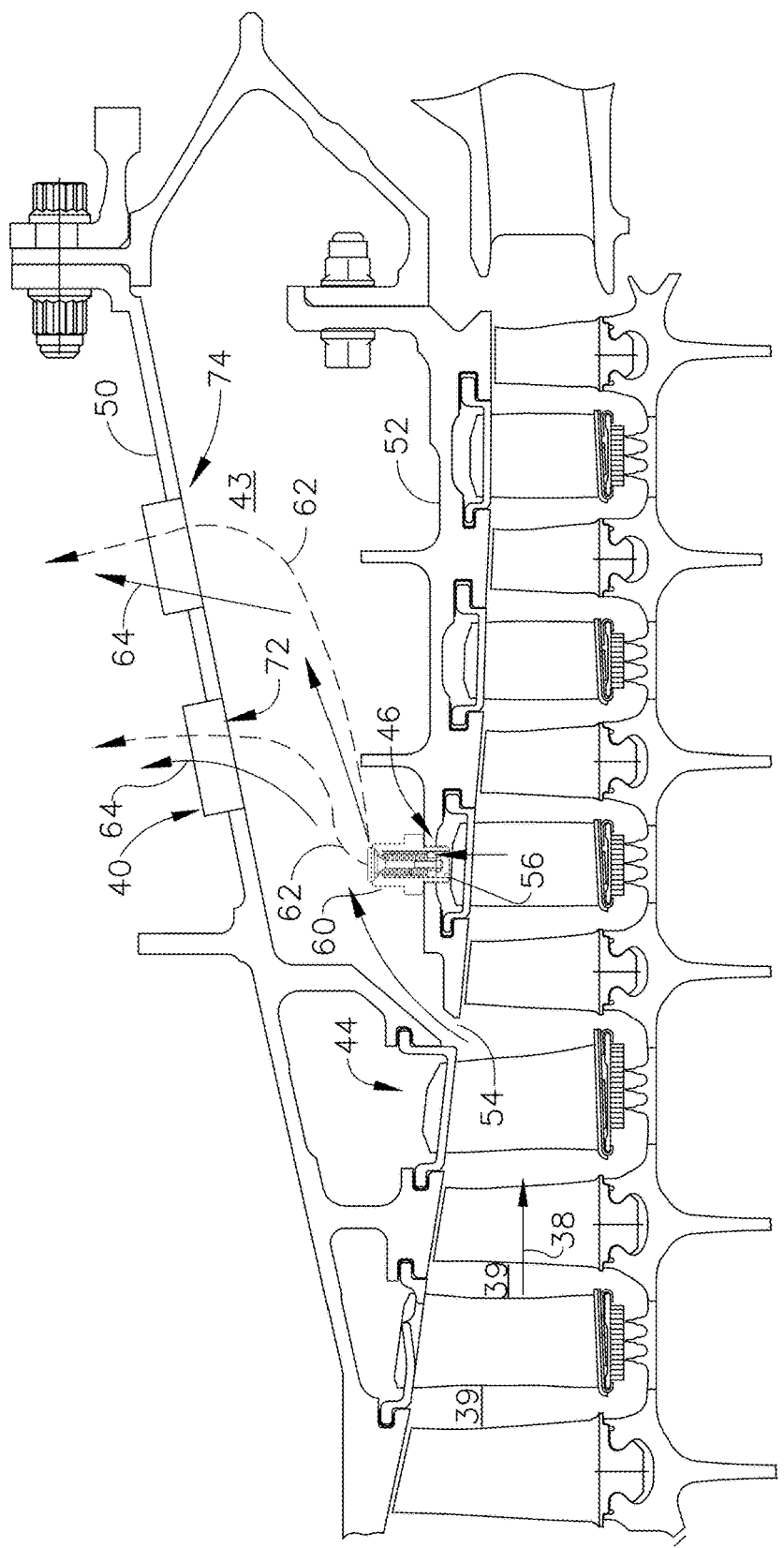
FIG. 3 is an enlarged schematic cross-sectional view illustration of an alternative exemplary embodiment of the bleed path illustrated in FIG. 2.

More than the one bleed outlet 42 may be used, examples being customer and domestic or engine bleed outlets 72, 74 as illustrated in FIG. 3. The customer and domestic or engine bleed outlets 72, 74 are in fluid flow communication with and serve as an outlet from a bleed plenum 43 circumferentially disposed between radially spaced apart annular outer and inner casings 50, 52. The customer and domestic or engine bleed outlets 72, 74 are radially disposed through the outer casing 50. There may be more than one customer or engine bleed outlet 72 and more than one domestic or engine bleed outlet 74 disposed around and through the outer casing 50.

The customer or engine bleed outlet 72 and the domestic or engine bleed outlet 74 may be disposed in rows around and through the outer casing 50. Illustrated in FIG. 3 is an embodiment of the compressor bleed assembly 40 that has both the customer and domestic or engine bleed outlets 72, 74 radially disposed through the outer casing 50 such that they can be used for both customer and domestic air supplies.

The customer and domestic or engine bleed outlets 72, 74 are used for customer and domestic air supplies. It is beneficial if such bleeds are collected from the furthest forward HPC stages to reduce the negative cycle impact for bleeding higher enthalpy fluid. Utilizing bleed air from more forward HPC stages, however, has the negative effect of providing lower secondary-flow circuit driving pressures. The autonomously actuated valve or poppet valve 60 as used herein addresses the problem of increasing flow pressures of air supplied from OD HPC bleeds to secondary flow circuits. Performance benefits include allowing cruise bleed to meet plenum pressurization requirements using a lower pressure compressor stage. Weight reduction may be available due to the ability to place flanges in good locations for the purpose of clearance control. Reduction in compressor axial length may also be possible.

Figure 4:
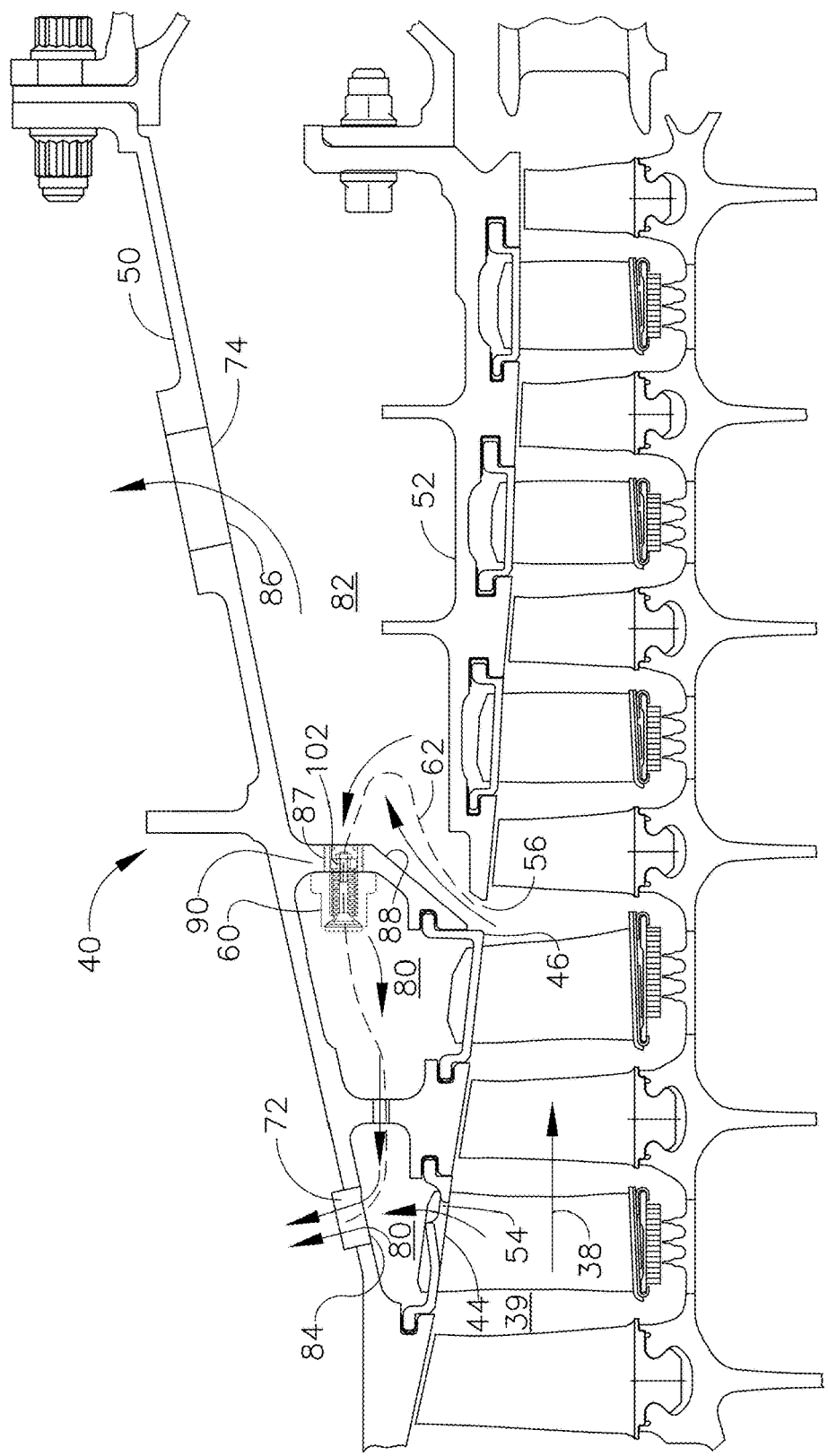
FIG. 4 is an enlarged schematic cross-sectional view illustration of another alternative exemplary embodiment of the bleed path illustrated in FIG. 2.

Illustrated in FIG. 4 is an embodiment of the compressor bleed assembly 40 that has annular forward and aft bleed plenums 80, 82 which are in fluid bleed air communication with forward and aft bleed outlets 84, 86, respectively. The forward and aft bleed outlets 84, 86 are radially disposed through the outer casing 50. The forward and aft bleed plenums 80, 82 correspond to the forward and aft bleed outlets 84, 86 which serve as customer and domestic or engine bleed outlets 72, 74. The forward and aft bleed plenums 80, 82 are axially separated by a bulkhead 88 illustrated herein as a radially inwardly depending annular flange 90 of the outer casing 50. The upstream and downstream bleed ports 54, 56 from the upstream and downstream stages 44, 46 of the compressor 18 to the forward and aft bleed plenums 80, 82 respectively are disposed through the inner casing 52.

One high pressure bleed path 62 extends from the downstream bleed port 56, through the aft bleed plenum 82, and then through apertures 87 in the annular flange 90 into the forward bleed plenum 80. Autonomously actuated valves illustrated as poppet valves 60 are disposed through the apertures 87 to allow higher pressure bleed air from the aft bleed plenum 82 to flow into the forward bleed plenum 80 and increase the pressure of the bleed air from upstream bleed ports 54 when the poppet valves 60 open. During such operation, lower pressure compressor bleed air from the upstream stage 44 mixes with higher pressure compressor bleed air from the downstream stage 46 which typically is during high pressure operation or excursions during a mission or flight.

Figure 5:
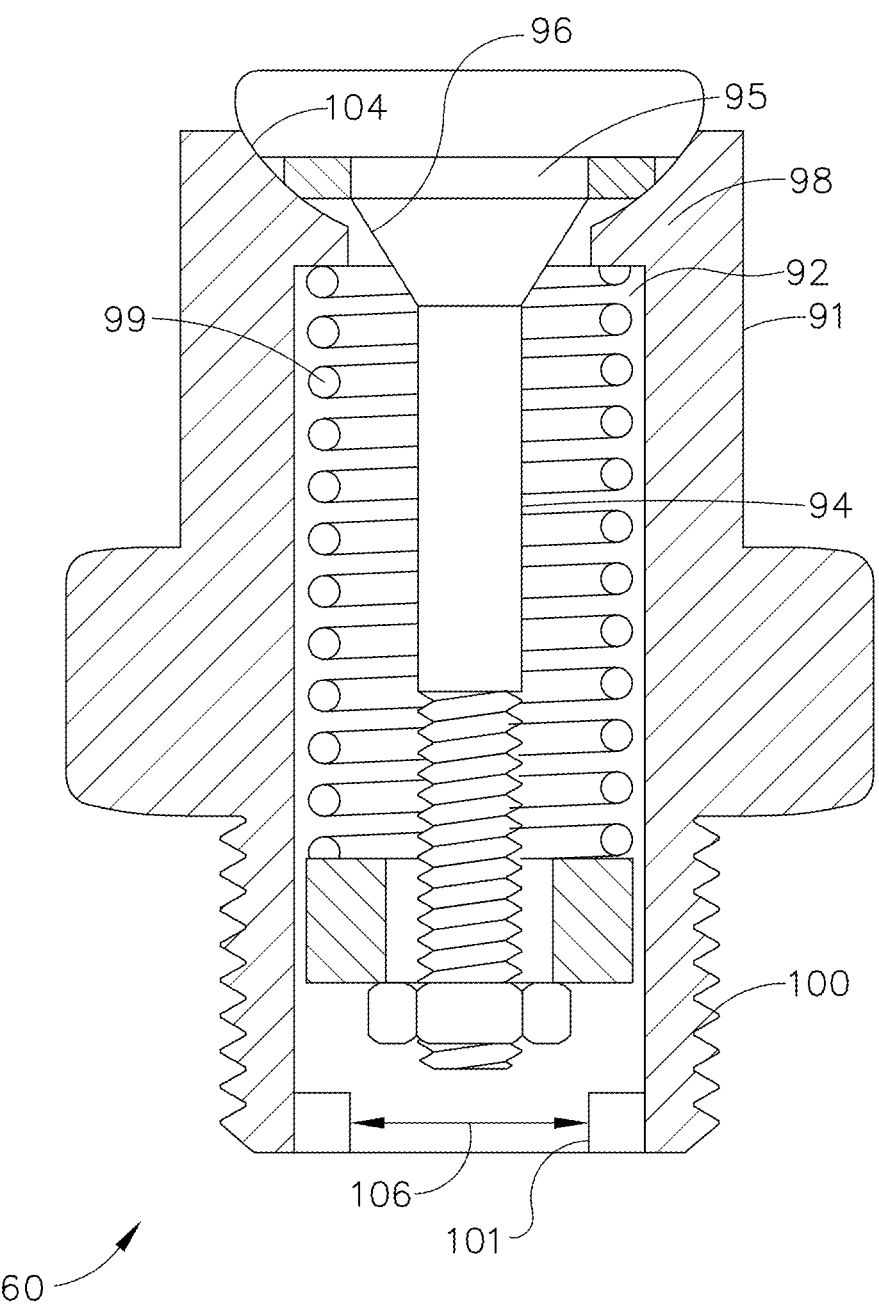
FIG. 5 is an enlarged schematic cross-sectional view illustration of a poppet valve serving as the exemplary embodiment of the self actuating bleed valve illustrated in FIG. 2.

An exemplary poppet valve 60 design suitable for use in the compressor bleed assembly 40 is illustrated in FIG. 5. The poppet valve 60 includes a hollow body 91 having a barrel 92 within which sits a poppet 94. A first end 95 of the poppet 94 seats in a spherical seat 96 at an upper end 98 or outlet 104 of the hollow body 91 and is spring loaded with respect to the hollow body 91 by a spring 99. The hollow body 91 has a threaded lower end 100 for mounting the poppet valve 60 in the threaded apertures 102 in the annular flange 90 or the outer casing 50. An inlet 101 to the hollow body 91 includes a controlled orifice 106. The orifice 106 is designed to operate as a choke point to control flow, even in the case of a poppet valve failure.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine compressor bleed assembly comprising:
   an annular bleed plenum radially disposed between radially spaced apart annular outer and inner casings circumscribing a compressor flowpath of a high pressure compressor,
   upstream and downstream bleed ports disposed through the inner casing and radially between the compressor flowpath and the bleed plenum at upstream and downstream stages respectively of the compressor,
   a bleed path extending from the downstream bleed port through the bleed plenum and out a bleed outlet radially disposed through the outer casing,
   an autonomously actuated valve disposed in the bleed path upstream of the bleed outlet,
   the autonomously actuated valve disposed in the downstream bleed port, and
   the autonomously actuated valve being a poppet valve.

2. An assembly as claimed in claim 1 wherein the poppet valve is set to open at take-off and/or climb.

3. A gas turbine engine compressor bleed assembly comprising:
   an annular bleed plenum radially disposed between radially spaced apart annular outer and inner casings circumscribing a compressor flowpath of a high pressure compressor,
   upstream and downstream bleed ports disposed through the inner casing and radially between the compressor flowpath and the bleed plenum at upstream and downstream stages respectively of the compressor,
   the upstream and downstream stages being adjacent stages in the compressor or non-adjacent stages spaced two or more stages apart in the compressor,
   a bleed path extending from the downstream bleed port through the bleed plenum and out a bleed outlet radially disposed through the outer casing,
   an autonomously actuated valve disposed in the bleed path upstream of the bleed outlet,
   the autonomously actuated valve disposed in the downstream bleed port, and
   the autonomously actuated valve being a poppet valve.

4. An assembly as claimed in claim 3 wherein the poppet valve is set to open at take-off and/or climb.

5. A gas turbine engine compressor bleed assembly comprising:
   an annular bleed plenum radially disposed between radially spaced apart annular outer and inner casings circumscribing a compressor flowpath of a high pressure compressor,
   upstream and downstream bleed ports disposed through the inner casing and radially between the compressor flowpath and the bleed plenum at upstream and downstream stages respectively of the compressor,
   a bleed path extending from the downstream bleed port through the bleed plenum and out a bleed outlet radially disposed through the outer casing,
   an autonomously actuated valve disposed in the bleed path upstream of the bleed outlet,
   the bleed outlet being one of customer and domestic or engine bleed outlets radially disposed through the outer casing and in fluid bleed air communication with the annular bleed plenum,
   the autonomously actuated valve disposed in the downstream bleed port, and
   the autonomously actuated valve being a poppet valve.

6. An assembly as claimed in claim 5 wherein the poppet valve is set to open at take-off and/or climb.

7. An assembly as claimed in claim 6 further comprising the upstream and downstream stages being adjacent stages in the compressor or non-adjacent stages spaced two or more stages apart in the compressor.

8. A gas turbine engine compressor bleed assembly comprising:
   an annular bleed plenum radially disposed between radially spaced apart annular outer and inner casings circumscribing a compressor flowpath of a high pressure compressor,
   upstream and downstream bleed ports disposed through the inner casing and radially between the compressor flowpath and the bleed plenum at upstream and downstream stages respectively of the compressor,
   a bleed path extending from the downstream bleed port through the bleed plenum and out a bleed outlet radially disposed through the outer casing,
   an autonomously actuated valve disposed in the bleed path upstream of the bleed outlet,
   the annular bleed plenum being one of annular forward and aft bleed plenums radially disposed between radially spaced apart annular outer and inner casings and circumscribing the compressor flowpath,
   the bleed outlet being one of forward and aft bleed outlets in fluid bleed air communication with the forward and aft bleed plenums respectively and radially disposed through the outer casing,
   the upstream and downstream bleed ports disposed through the inner casing and radially between the compressor flowpath and the forward and aft bleed plenums at upstream and downstream stages respectively of the compressor,
   the bleed path extending from the downstream bleed port through the forward and aft bleed plenums and out the forward bleed outlet, and
   the autonomously actuated valve disposed in the bleed path between the forward bleed outlet and the downstream bleed port.

9. An assembly as claimed in claim 8 further comprising the autonomously actuated valve disposed in a bulkhead or an annular flange of the outer casing axially separating the forward and aft bleed plenums.

10. An assembly as claimed in claim 9 further comprising the autonomously actuated valve being a poppet valve.

11. An assembly as claimed in claim 10 wherein the poppet valve is set to open at take-off and/or climb.

\* \* \* \* \*